United States Patent [19]

Breda et al.

[11] 4,414,151
[45] Nov. 8, 1983

[54] CHROMIFEROUS COMPLEX DYESTUFFS, A PROCESS FOR THEIR PREPARATION AND THEIR APPLICATION

[75] Inventors: Antoine G. L. J. Breda, Craponne; Jacques G. R. Roussel, Bosc Roger en Roumois, both of France

[73] Assignee: P C U K Produits Chimiques Ugine Kuhlmann, Courbevoie, France

[21] Appl. No.: 282,902

[22] Filed: Jul. 13, 1981

[30] Foreign Application Priority Data

Jul. 18, 1980 [FR] France ................................. 8015879

[51] Int. Cl.$^3$ .............................................. C09B 45/00
[52] U.S. Cl. ................................................. 260/145 B
[58] Field of Search ..................................... 260/145 B

[56] References Cited

U.S. PATENT DOCUMENTS

| | | | |
|---|---|---|---|
| 1,990,453 | 2/1935 | Hund et al. ...................... | 564/186 X |
| 2,741,657 | 4/1956 | Schmid et al. .................. | 564/186 X |
| 3,067,191 | 12/1962 | North et al. ...................... | 260/145 B |
| 4,052,376 | 10/1977 | Breda et al. ...................... | 260/145 B |
| 4,247,455 | 1/1981 | Idelson ............................ | 260/145 B |

FOREIGN PATENT DOCUMENTS

| | | | |
|---|---|---|---|
| 2504787 | 8/1975 | Fed. Rep. of Germany ... | 260/145 B |
| 754639 | 11/1933 | France . | |
| 1356566 | 2/1964 | France . | |

OTHER PUBLICATIONS

Lappert et al., Metal and Metalloid Amides, Ellis Horwood Limited, N.Y., pp. 661, 681, 682, 683, (1980).

*Primary Examiner*—Helen M. S. Sneed
*Attorney, Agent, or Firm*—Beveridge, DeGrandi & Kline

[57] ABSTRACT

The invention relates to new chromiferous complex dyestuffs of the general formula:

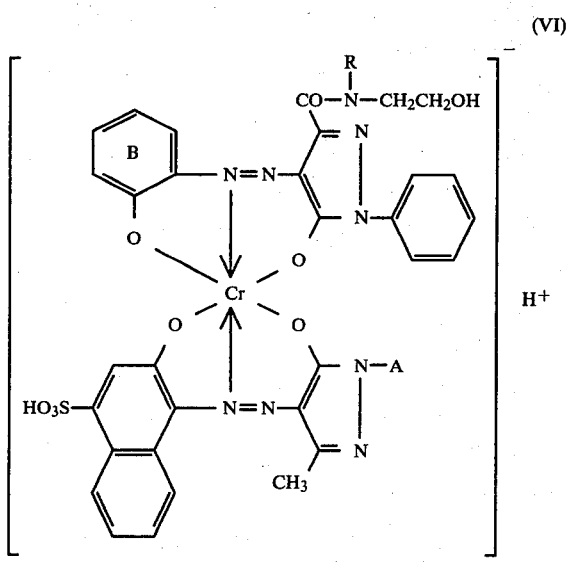

(VI)

in which R represents a hydrogen atom or a $\beta$-hydroxyethyl group, A represents a hydrogen atom, a phenyl group or a phenyl group substituted by one or more halogen atoms or alkyl groups of low molecular weight, and the nucleus B may be substituted by one or more chlorine atoms.

These complexes may be used for the coloration of the natural or synthetic polyamides or leather.

14 Claims, No Drawings

CHROMIFEROUS COMPLEX DYESTUFFS, A PROCESS FOR THEIR PREPARATION AND THEIR APPLICATION

The present invention relates to new chromiferous complex dyestuffs which are particularly interesting for the coloring of natural or synthetic polyamides and leather.

In French Pat. No. 2,271,267, filed Feb. 6, 1974 (74 03912) which corresponds to U.S. Pat. No. 4,052,376, chromiferous complex dyestuffs are described which, in the acid form can be represented by the general formula:

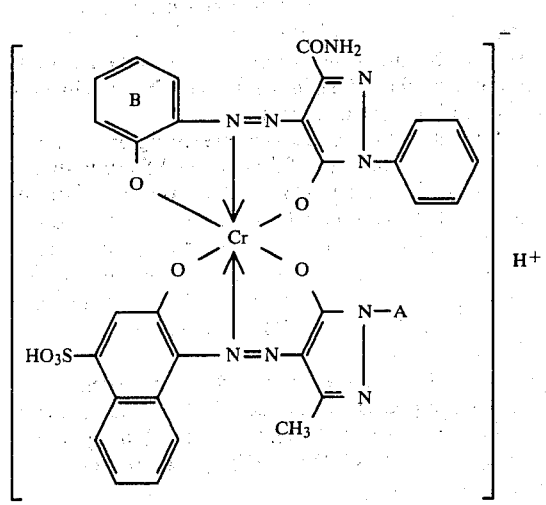

in which A represents a hydrogen atom, a phenyl group or a phenyl group substituted by one or more halogen atoms (preferably one or two chlorine atoms) or alkyl groups of low molecular weight (preferably methyl or ethyl) and the nucleus B may be substituted by one or more chlorine atoms. For the preparation of these complexes a monoazo compound may be used of the formula:

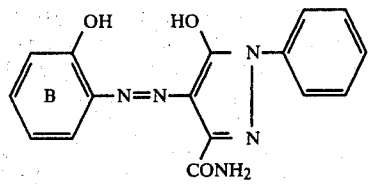

which is derived from 1-phenyl-3-carbamoyl-5-pyrazolone, a coupling compound generally prepared by condensation of phenylhydrazine with diethyl oxalacetate, cyclization to 1-phenyl-3-carbethoxy-5-pyrazolone and subsequent formation of the amide by ammonia to 1-phenyl-3-carbamoyl-5-pyrazolone. In the industrial stage of the process, this final reaction of amide formation is always accompanied by a partial hydrolysis of the carbethoxy function to carboxy, so that the dyestuffs thus produced always contain, in addition to the complex of formula (I), a variable and not negligible proportion of the complex of the formula:

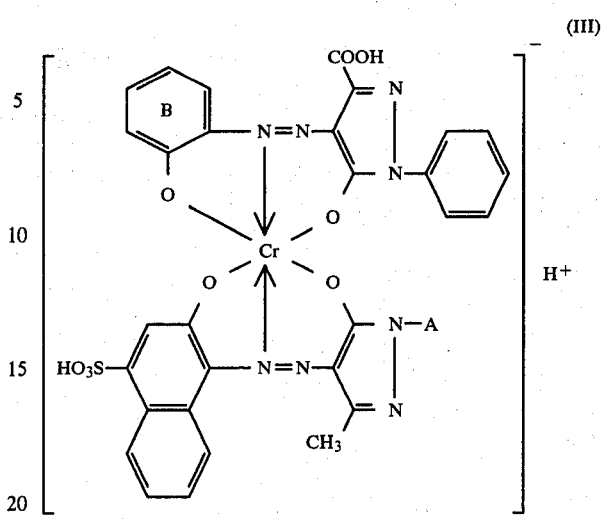

which, compared with the corresponding complex of formula (I) is found to be hypsochromic and inferior in fastness to light and moisture.

To obviate this disadvantage, it has been tried to transfer the amide-formation to a later stage of the preparation either by making the amide from a monoazo compound of the formula:

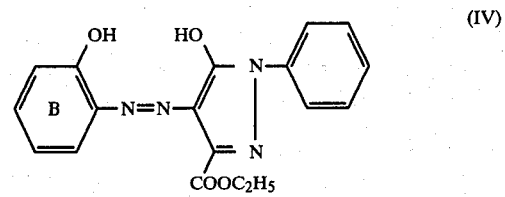

in order thus to obtain the corresponding monoazo compound of formula (II), or by carrying out the amide formation of a complex of the formula:

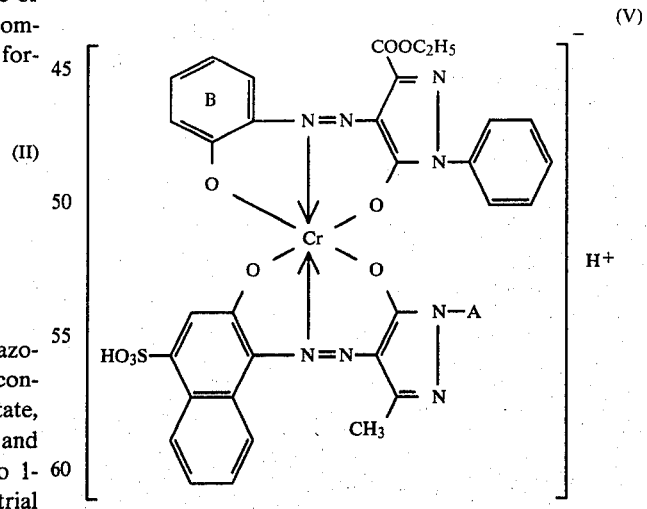

so as to obtain the dyestuff of the corresponding formula (I). However, the amide formation by ammonia effected at these stages is also accompanied by formation of the corresponding carboxyl derivatives.

It has now been found surprisingly that, when the ammonia is replaced by mono- or di-ethanolamine, the amide formation, whatever may be the stage at which it is carried out, leads industrially to dyestuffs which contain no or very little carboxyl dyestuffs and for this reason show excellent coloristic properties.

The present invention therefore has as its object the new chromiferous complex dyestuffs thus obtained which, in the acid form, can be represented by the general formula:

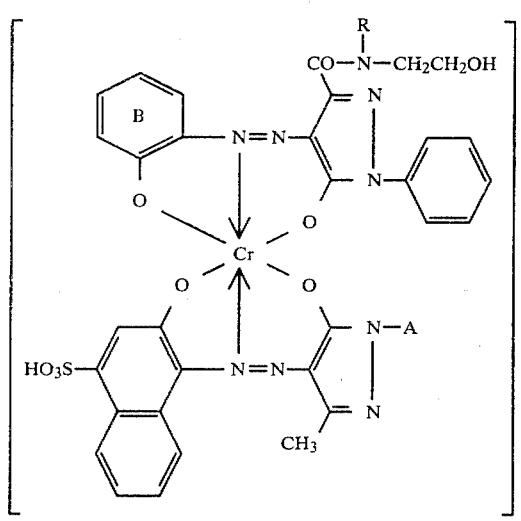

(VI) H+ in which A and B have the same significance as above and R represents a hydrogen atom or a β-hydroxyethyl group.

The invention also relates to a process of preparation of the dyestuffs of formula (VI) which consists, in the series of operations well known for the manufacture of complexes of this type, in amidifying by mono- or di-ethanolamine a carbethoxylated precursor of the complexes (VI), this precursor being able to be 1-phenyl-3-carbethoxy-5-pyrazolone, a monoazo compound of formula (IV) or a complex of formula (V). Thus, according to the stage in which the amide formation is carried out by the mono- or di-ethanolamine, the dyestuffs according to the invention of formula (VI) can be prepared according to one or other of the following methods:

(1) A first method consists in forming the amide of 1-phenyl-3-carbethoxy-5-pyrazolone by mono- or di-ethanolamine, then coupling the 1-phenyl-N-(β-hydroxyethyl) or N,N-bis(β-hydroxyethyl)3-carbamoyl-5-pyrazolone thus obtained with o-aminophenol, or a chlorinated derivative thereof, then reacting in approximately equimolecular proportions the monoazo compound thus obtained of the formula:

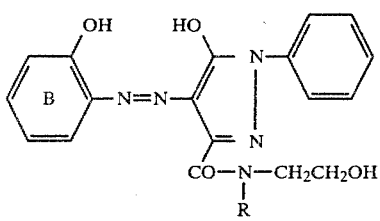

(VII)

with the 1/1 chromiferous complex of a monoazo compound of the formula:

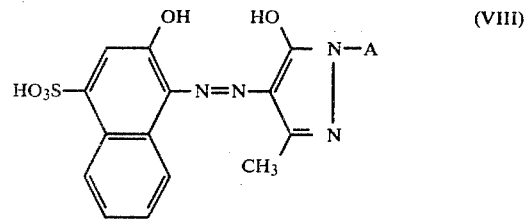

(VIII)

or, inversely, reacting the 1/1 chromiferous complex of a monoazo compound of formula (VII) on a monoazo compound of formula (VIII).

(2) A second method consists in amide formation by mono- or di-ethanolamine of a monoazo compound of formula (IV), then as in the previous method, reacting the monoazo compound of formula (VII) thus obtained or its 1/1 chromiferous complex on a monoazo compound of formula (VIII), in the form of the 1/1 chromiferous complex or not, respectively.

(3) A third method consists in preparing by a method known per se a complex of formula (V) from monoazo compounds of formulae (IV) and (VIII), then forming the amide of this complex by means of mono- or diethanolamine. If desired, this may be effected in a single stage by carrying out the condensation of the monoazo compound (IV) and the 1/1 chromiferous complex of the monoazo compound (VIII) in the presence of mono- or di-ethanolamine.

The coupling operation for the formation of the monoazo compounds of formula (VII) or the operation of condensation for the formation of the ½ complexes of formulae (V) and (VIII) are effected according to the usual well known methods.

The amide formation may be effected between 20° and 100° C., preferably between 80° and 90° C., by adding to an aqueous press paste of the carbethoxylated precursor 3 to 12 moles of mono- or di-ethanolamine per mole of precursor.

A preferred manner of carrying out the first method consists in forming and making the amide of 1-phenyl-3-carbethoxy-5-pyrazolone in a single stage. For this purpose, an aqueous paste of diethyl oxalacetate phenylhydrazone is heated at a temperature not greater than 85° C., preferably 80° C., until the hydrazone has completely melted, and then the aqueous phase is eliminated and the remaining anhydrous hydrazone is treated with 3 to 12 molar equivalents of mono- or di-ethanolamine. This method is disclosed in our copending application Ser. No. 282,903 filed concurrently herewith now U.S. Pat. No. 4,348,528.

When applied to fibers of natural (wool) or synthetic polyamides and on leather according to the known processes of dyeing or printing, the new dyestuffs of formula (VI) and their salts provide colorations of bordeaux shade with very good fastness to light and to washing. The reproducibility of their shade and of their fastness is superior to that of the dyestuffs of formula (I).

The dyestuffs according to the invention also show the peculiarity of not subliming and of completely preserving their tinctorial yield and their shade, even after an exposure of 45 minutes at a temperature of 290° to 300° C. This property is preserved even if the exposure at high temperature is made in fused polyamides such as the polyamides 6, 6—6 and 11 which are the most commonly used to obtain textile threads or filaments, as well as fibers, foils or moulded or extruded objects. This peculiarity of the complexes according to the invention enables them to be used for the coloration and for the dyeing in bulk of the synthetic polyamides.

The following examples, in which the parts and percentages indicated are given by weight unless the contrary is mentioned, illustrate the invention without it being limited thereto.

EXAMPLE 1

(a) Preparation of 1-phenyl-N-(β-hydroxyethyl)-3-carbamoyl-5-pyrazolone 1000 parts of water, then 4000 parts of an aqueous paste of diethyl oxalacetate phenylhydrazone, containing about 44% of dry material or solids and 1347 parts of pure hydrazone, are charged into a vitrified steel reactor having a capacity of 7000 parts by volume. Then 750 parts of sodium chloride are added to adjust the density of the aqueous phase to about 1.18, and the mixture is heated at 80° C. until the whole of the supernatant hydrazone has melted, then the salted aqueous phase is removed. 1050 parts of monoethanolamine are run into the remaining anhydrous hydrazone, maintained at between 70° and 80° C.; since the reaction is exothermic, the introduction of monoethanolamine is regulated so that the temperature remains below 85° C. When the introduction of monoethanolamine is finished, it is progressively heated while the ethyl alcohol formed is distilled; the temperature of the reaction mass at the end of the distillation must not exceed 110° C.

2280 parts of a viscous liquid are thus obtained containing 1185 parts of 1-phenyl-N-(β-hydroxyethyl)-3-carbamoyl-5-pyrazolone. This viscous liquid may be diluted with water if desired and is directly usable in the subsequent stage.

(b) Preparation of the 4-(5-chloro-2-hydroxy-phenylazo)-N-(β-hydroxyethyl)-3-carbamoyl-5-hydroxy-1-phenyl-pyrazole 143.5 parts of 4-chloro-2-amino-phenol are made into a paste in 1000 parts of water, then 220 parts of hydrochloric acid having a density of 1.08 are added and the temperature is taken to between 0° and 5° C. by addition of ice. Then it is diazotised by means of 138 parts of a 50% aqueous solution of sodium nitrite.

On the other hand, in another reactor are charged 475 parts of the viscous liquid obtained previously (that is, 247 parts of pure 1-phenyl-N-(β-hydroxyethyl)-3-carbamoyl-5-pyrazolone), then the volume is taken to 2000 parts with water and the pH is adjusted to 6 by addition of acetic acid. The mixture is heated to 35° C., then the diazo suspension obtained as indicated above is introduced in 4 hours, while the temperature is maintained at 35° C. and the pH is kept at between 6 and 7. The monoazo compound is precipitated; it is filtered and washed on the filter with water. 1000 parts of a paste are thus obtained containing about 373 parts of pure 4-(5-chloro-2-hydroxy-phenylazo)-N-(β-hydroxyethyl)-3-carbamoyl-5-hydroxy-1-phenyl-pyrazole.

(c) Preparation of the complex according to the invention 107.6 parts of the paste obtained above (corresponding to 40.15 parts of pure monoazo) are diluted in 500 parts of water, then 66 parts are added of a paste of the 1/1 chrome complex of the compound [2-hydroxy-4-sulpho-naphthalene]-<1 azo 4>-[5-hydroxy-3-methyl-1-phenyl-pyrazole] containing 55 parts of pure 1/1 complex It is heated at a temperature between 85° and 95° C. and the pH is maintained in the neighborhood of 7 by simultaneous introduction of an aqueous solution of sodium hydroxide having a density of 1.25. The condensation is effected in about an hour. It is cooled to 70° C., 65 parts of sodium chloride are added and it is filtered.

185 parts of a paste are thus obtained containing 83 parts of the sodium salt of the complex of the formula:

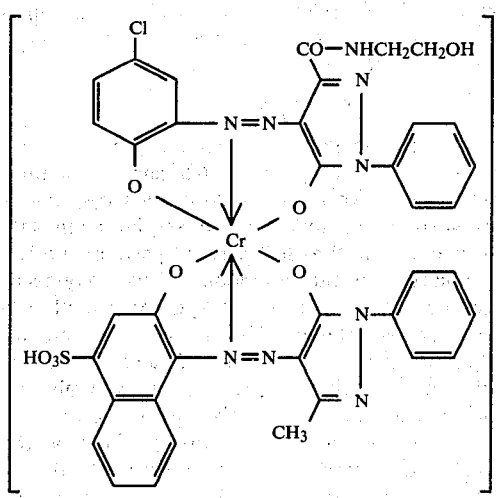

practically free from carboxyl derivative.

When applied on wool, nylon and leather, this complex leads to bordeaux shades which are well reproducible and have excellent fastness to light and washing. On bulk coloration of the synthetic polyamides, this complex shows a particularly good thermic fastness.

EXAMPLE 2

232 parts of 1-phenyl-3-carbethoxy-5-pyrazolone are dissolved in 1500 parts of water by means of 130 parts of sodium carbonate. The mixture is heated to 40° C., then a diazo suspension prepared as in Example 1-b (first paragraph) from 143.5 parts of 4-chloro-2-amino-phenol is added. The precipitate is filtered and washed on the filter with water. 900 parts of a paste containing about 329 parts of 4-(5-chloro-2-hydroxy-phenylazo)-3-carbethoxy-5-hydroxy-1-phenyl-pyrazole are obtained.

These 900 parts of paste are added to 650 parts of monoethanolamine and it is heated at 85° C. for about 2 hours until the end of the reaction (control by chromatography). The mass obtained which contains about 340 parts of 4-(5-chloro-2-hydroxyphenylazo)-N-(β-hydroxyethyl)-3-carbamoyl-5-hydroxy-1-phenyl-pyrazole and very little of the corresponding 3-carboxy derivative, is used as it is for the preparation of complexes according to the invention, for example on operating as in Example 1-c.

The mass can be practically free from 3-carboxy derivative if, in place of the 900 parts of paste of 4-(5-chloro-2-hydroxyphenylazo)-3-carbethoxy-5-hydroxy-1-phenyl-pyrazole, this dry monoazo substance is used for the subsequent operation.

EXAMPLE 3

1058 parts of a paste obtained as in the first paragraph of Example 2 and containing 386.5 parts of the pure monoazo compound 4-(5-chloro-2-hydroxyphenylazo)-3-carbethoxy-5-hydroxy-1-phenyl-pyrazole are made into a paste in a mixture of 650 parts of monoethanolamine and 480 parts of water. Then 660 parts of the 1/1 chrome complex of the compound [2-hydroxy-4-sulfo-naphthalene]-<1 azo 4>-[5-hydroxy-3-methyl-1-phenyl-pyrazole] containing 550 parts of pure 1/1 complex are added, then the mixture is heated at 85° C. until the end of the reaction, that is about one hour. The complex of formula (IX) is precipitated by pouring 6500 parts of 18% salt water into the reaction mass. After filtering and draining 1850 parts of a paste containing 830 parts of dyestuff are obtained of which the chromatography demonstrates that it contains only very little of carboxyl complex.

EXAMPLE 4

1058 parts of a paste obtained as in the first paragraph of Example 2 and containing 386.5 parts of a pure monoazo 4-(5-chloro-2-hydroxy-phenylazo)-3-carbethoxy-5-hydroxy-1-phenyl-pyrazole, are diluted in 5000 parts of water, as well as 660 parts of paste of the 1/1 chrome complex of the compound [2-hydroxy-4-sulpho-naphthalene]-<1 azo 4>-[5-hydroxy-3-methyl-1-phenyl-pyrazole] containing 550 parts of pure 1/1 complex. Then it is heated to between 85° and 100° C. for about two hours, while the pH is maintained at about 7 by addition of 800 parts of a 10% aqueous solution of sodium hydroxide. Salt is added progressively at the rate of 10% with respect to the volume in order to precipitate the complex carbethoxyl compound of the formula:

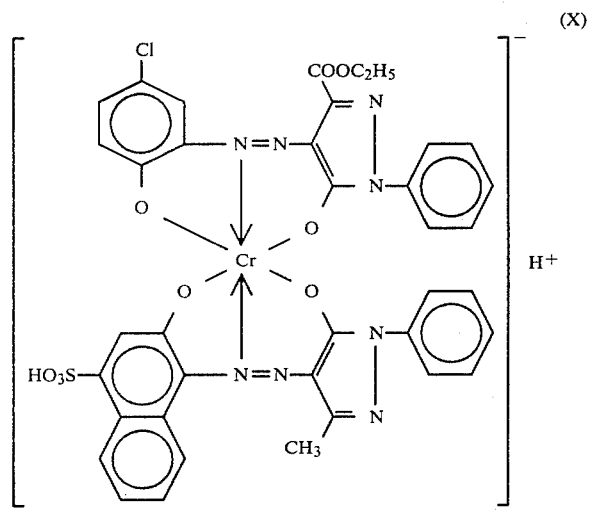

(X)

which is filtered and made into a paste in 650 parts of monoethanolamine previously taken to a temperature of 85° C. This temperature is maintained until the complete transformation of the carbethoxy group into the N-(β-hydroxyethyl)-carbamoyl group, that is for about one hour. The reaction mass is then diluted with 6500 parts of 18% salted water. After filtering and draining, 1850 parts of a paste containing 830 parts of practically pure complex of formula (XI) are obtained.

EXAMPLE 5

On operating as in Example 1 or 2, but replacing the 4-chloro-2-amino-phenol by 178 parts of 4,6-dichloro-2-amino-phenol, a dyestuff possessing similar properties is obtained.

EXAMPLE 6

100 parts of polyamide 6—6 (polyadipate of hexamethylenediamine) and 0.5 parts (dry weight) of the dyestuff obtained in Example 1 are mixed for an hour in a cylindrical vessel turning on its axis. The mixture is then introduced into a screw extruder of which the spinneret is heated at 285° C. At the exit from the extruder, the mixture is cooled, then converted into grains of about 2 mm (side). The grains are dried, then introduced into a spinning apparatus where the molten mixture is subjected to a constant pressure on a fusion grate at 290° C. before passing over a filter bed based on washed and roasted river sand, the grains of which have a dimension of the order of 0.03 mm, then through a spinneret having seven orifices of 0.23 mm in diameter. The control of the apparatus is effected so that after a subsequent drawing of coefficient 4 the seven filaments each has a titre of 17 decitex. There are thus obtained polyamide 6—6 threads colored in a very fast bordeaux shade.

EXAMPLE 7

1.5 parts (dry weight) of the dyestuff obtained in Example 1 are made into a paste in 7.5 parts of demineralized water at 40° C. The mixture is introduced into a dyeing apparatus able to function under pressure and already containing 1000 parts of demineralized water taken to pH 5 by addition of acetic acid. Then 300 parts of polyamide 6 are added in the form of small granules of about 2 mm (side), the temperature is taken to about 103° C. in a period of 30 minutes and maintained at this temperature for one and a half hours with agitation. The granules dyed in bordeaux are then washed in demineralized water and dried. On operating under the conditions of Example 6, they can then be converted into threads of very fast bordeaux shade.

What is claimed is:

1. The chromiferous complex dyestuffs which, in the acid form, correspond to the general formula

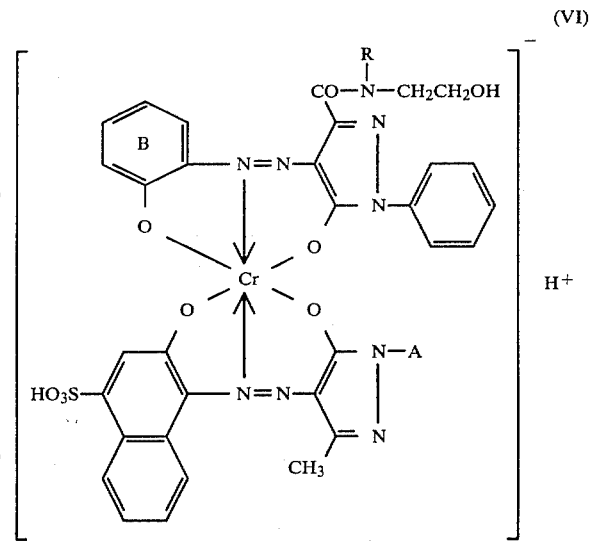

(VI)

in which R represents a hydrogen atom or a β-hydroxyethyl group, A represents a hydrogen atom, a phenyl group or a phenyl group substituted by one or more halogen atoms or alkyl groups of low molecular weight, and the nucleus B may be substituted by one or more chlorine atoms.

2. Chromiferous complex dyestuff according to claim 1 which, in the acid form, corresponds to the formula:

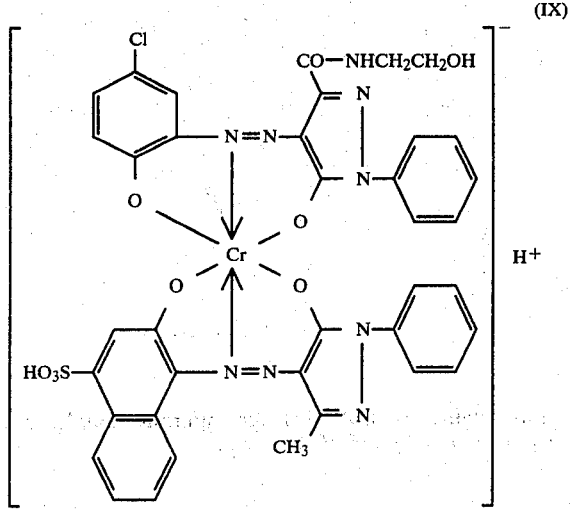

(IX)

3. A process for the preparation of the dyestuffs according to claim 1, in which a carbethoxyl precursor of the complexes of formula (VI) is reacted with mono- or di-ethanolamine to prepare the corresponding amide, this precursor being 1-phenyl-3-carbethoxy-5-pyrazolone, a monoazo compound of the formula:

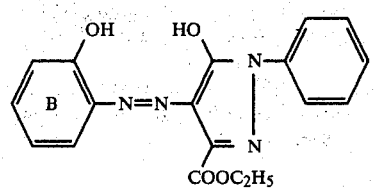

(IV)

or a complex of the formula:

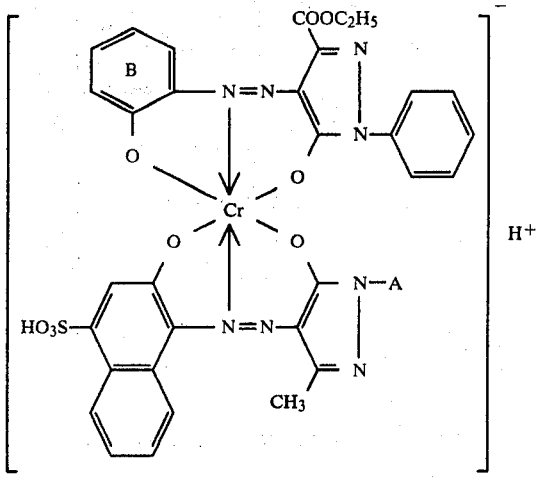

(V)

in which formula A and B have the same significance as in claim 1.

4. A process according to claim 3 in which 3 to 12 moles of mono- or di-ethanolamine are used per mole of precursor.

5. A process according to claim 3 or 4 in which the amide of 1-phenyl-3-carbethoxy-5-pyrazolone is prepared in a single stage by reacting molten anhydrous diethyl oxalacetate phenylhydrazone with mono- or diethanolamine.

6. A process for the preparation of the dyestuffs according to claim 1 which comprises reacting 1-phenyl-3-carbethoxy-5-pyrazolone with mono- or di-ethanolamine, then coupling the 1-phenyl-N-(β-hydroxyethyl) or N,N-bis(β-hydroxyethyl)-3-carbamoyl-5-pyrazolone thus obtained with the diazo derivative of o-aminophenol or a chlorinated derivative thereof and reacting in approximately equimolecular proportions the monoazo compounds thus obtained of the formula:

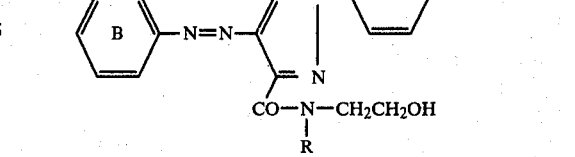

(VII)

with the 1/1 chromiferous complex of a monoazo compound of the formula:

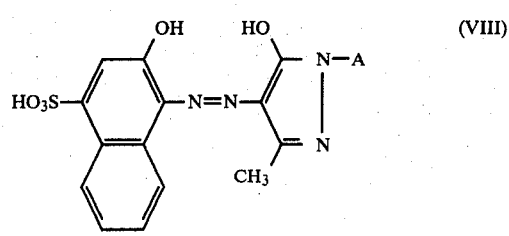

(VIII)

A, B and R having the same significance as in claim 1.

7. A process for the preparation of the dyestuffs according to claim 1 which comprises reacting 1-phenyl-3-carbethoxy-5-pyrazolone with mono- or di-ethanolamine, then coupling the 1-phenyl-N-(β-hydroxyethyl) or N,N-bis(β-hydroxyethyl)-3-carbamoyl-5-pyrazolone thus obtained with the diazo derivative of o-aminophenol or a chlorinated derivative thereof and reacting in approximately equimolecular proportions the 1/1 chromiferous complex of the monoazo compounds thus obtained of the formula:

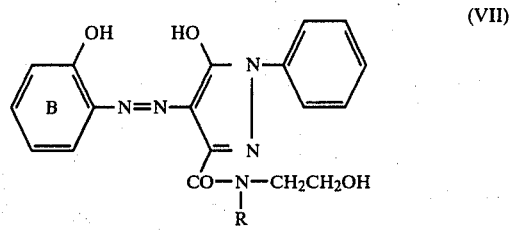

(VII)

with a monoazo compound of the formula:

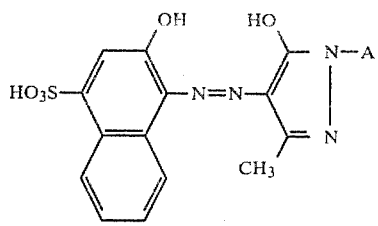

(VIII)

A, B and R having the same significance as in claim 1.

8. A process for the preparation of the dyestuffs according to claim 1 which comprises reacting mono- or di-ethanolamine with a monoazo compound of the formula:

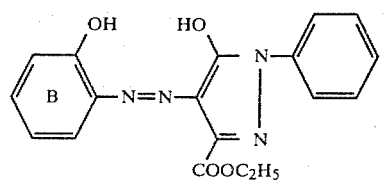

(IV)

then reacting the 1/1 chromiferous complex of the monoazo compound of formula:

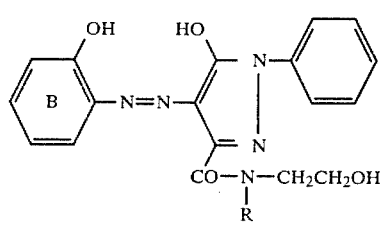

(VII)

thus obtained with a monoazo compound of the formula:

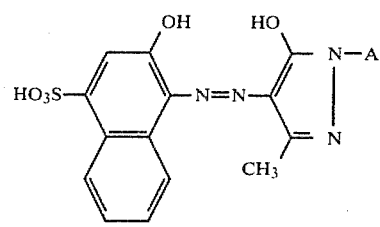

(VIII)

A, B and R having the same significance as in claim 1.

9. A process according to claim 6 or 7 wherein 3 to 12 molar equivalents of mono- or di-ethanolamine are used.

10. A process according to claim 6 or 7 wherein 1-phenyl-3-carbethoxy-5-pyrazolone is prepared and reacted with mono- or di-ethanolamine in a single stage which comprises reacting molten anhydrous diethyl oxalacetate phenylhydrazone with 3 to 12 molar equivalents of mono- or di-ethanolamine.

11. A process for the preparation of the dyestuffs according to claim 1 which comprises reacting mono- or di-ethanolamine with a monoazo compound of the formula:

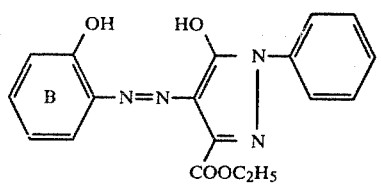

(IV)

then reacting the monoazo compound of the formula:

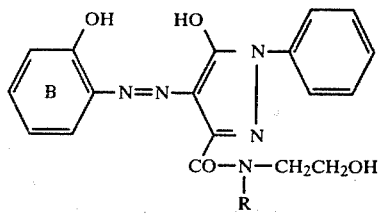

(VII)

thus obtained with the 1/1 chromiferous complex of a monoazo compound of the formula:

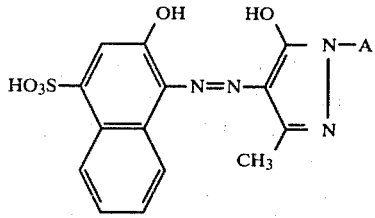

(VIII)

A, B and R having the same significance as in claim 1.

12. The process according to claim 6 or 11 wherein 3 to 12 molar equivalents of mono- or di-ethanolamine are used.

13. A process for the preparation of the dyestuffs according to claim 1 which comprises reacting mono- or di-ethanolamine with a chromiferous complex of the formula:

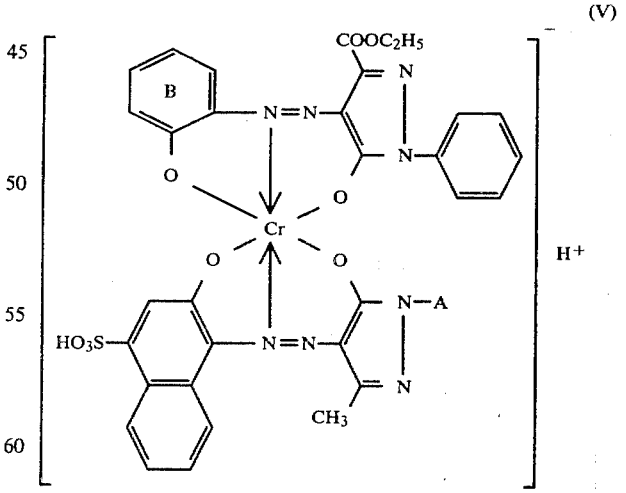

(V)

wherein A and B have the same significance as in claim 1.

14. A process according to claim 13 wherein 3 to 12 molar equivalents of mono- or di-ethanolamine are used.

* * * * *